United States Patent

Neace, Jr. et al.

(10) Patent No.: US 7,858,133 B2
(45) Date of Patent: Dec. 28, 2010

(54) COLD BREW COFFEE MAKER

(76) Inventors: Robert Neace, Jr., 6715 NE. 63rd St., #294, Vancouver, WA (US) 98661; Todd H. Maas, 1394 Boca Raton Dr., Lake Oswego, OR (US) 97034

( * ) Notice: Subject to any disclaimer, the term of this patent is extended or adjusted under 35 U.S.C. 154(b) by 1289 days.

(21) Appl. No.: 11/406,742

(22) Filed: Apr. 18, 2006

(65) Prior Publication Data

US 2006/0230944 A1      Oct. 19, 2006

Related U.S. Application Data

(60) Provisional application No. 60/672,591, filed on Apr. 18, 2005.

(51) Int. Cl.
*A23F 5/00* (2006.01)

(52) U.S. Cl. .................. 426/425; 426/590; 426/432; 426/594; 210/219; 210/474; 210/481; 99/279; 99/283; 99/300; 99/295; 99/304; 99/316; 99/323

(58) Field of Classification Search .............. 426/425, 426/422, 431, 433, 86, 77, 590, 596, 435, 426/402, 405; 99/279, 283, 300, 295, 296, 99/304, 306, 316, 319, 323; 210/219, 474, 210/481

See application file for complete search history.

(56) References Cited

U.S. PATENT DOCUMENTS

| | | | |
|---|---|---|---|
| 2,263,610 A * | 11/1941 | Cain | .............. 426/432 |
| 2,851,185 A * | 9/1958 | Taylor | ............ 248/346.04 |
| 2,878,746 A | 3/1959 | Schwinger | |
| 4,112,830 A | 9/1978 | Saito | |
| 4,143,590 A * | 3/1979 | Kasakoff | ............... 99/296 |
| 4,622,230 A | 11/1986 | Stone, Jr. | |
| 5,605,710 A | 2/1997 | Pridonoff et al. | |
| 6,761,918 B2 | 7/2004 | Pulikkottil et al. | |

* cited by examiner

*Primary Examiner*—Jennifer C McNeil
*Assistant Examiner*—Hong Mehta
(74) *Attorney, Agent, or Firm*—Bullivant Houser Bailey PC

(57) ABSTRACT

An hourglass shaped apparatus for cold brewing coffee, comprising a brew chamber, an extract chamber and a center piece connecting the brew and extract chambers. The extract and brew chambers comprise two ends of the hourglass shaped apparatus and the center piece comprises middle portion. The brew chamber houses a free standing self-contained filter assembly containing coffee grounds inside a micro-fine wire mesh. Water is poured into the brew chamber to generate coffee extract through cold water infusion. After the brewing process, the apparatus is inverted, and the coffee travels into the extract chamber through the center piece for dispensing. Coffee brewed in this manner is less acidic and more flavorful than the conventionally hot-brewed beverage. All the components of the apparatus, the filter assembly, the brew chamber, the extract chamber, and the center tie piece, are detachable.

14 Claims, 18 Drawing Sheets

COLD BREW COFFEE MAKER

CROSS-REFERENCE TO RELATED APPLICATIONS

This is a utility patent application which claims benefit of U.S. Provisional Application No. 60/672,591, filed on Apr. 18, 2005

FEDERALLY SPONSORED RESEARCH

Not Applicable

SEQUENCE LISTING

Not Applicable

FIELD OF THE INVENTION

The present invention generally relates to an improved apparatus for brewing coffee and more particularly to an improved apparatus that cold brews coffee to produce an infusion of coffee extract, and also stores and dispenses coffee.

BACKGROUND

Apparatuses for brewing coffee are well known in the art. In the known art, coffee is customarily drip-brewed using heated water. Water is heated in a vessel, and then poured over a container of ground coffee. As the water mingles with the grounds, a coffee extract is produced which drips through a filter into a coffee pot or cup. Improvements to the art have lead to machines that automatically heat water and brew coffee in one self-contained device.

Although coffee is traditionally brewed in hot or boiling water, it is also possible to cold brew coffee. A preference for cold brewed coffee has developed, principally due to its flavor. Since many of the bitter oils and acids contained in coffee are soluble only at high temperature, coffee brewed with hot or boiling water is characterized by a harsh acrid taste. Cold brewed coffee avoids this problem. As the preference for cold brewed coffee has grown, several developments in the cold brew process have been made.

U.S. Pat. No. 4,051,264 to Sanderson discloses a process for obtaining a cold water extract from tea leaves. The process involves treating fresh green tea leaves with an enzyme additive to produce dry tea leaves which are cold water extractable. In addition, U.S. Pat. No. 6,761,918 to Pulikkottil discloses a method of processing green tea leaves to produce black tea particles that can be brewed in cold water.

U.S. Pat. No. 2,878,746 discloses a cold water coffee brewer comprising a large canister into which coffee grounds are placed and through which cold water is circulated. This device is designed to accomplish an infusion of water with coffee extract, similar to the present invention. However, it is structurally distinct, and performs the infusion through a drip mechanism rather than soaking. U.S. Pat. No. 4,112,830 discloses a similar device using cold water to obtain an extraction. This device is also structurally distinct from the present invention, complex and difficult to clean.

The aforementioned cold brewing methods and devices are either meant for brewing substances other than coffee, or they are structurally different from the present invention, and are designed for a different type of process. Therefore, it is an object of the present invention to provide an improved apparatus for cold brewing coffee to produce a liquid extract or infusion that can brew, store and dispense coffee.

A further object of the present invention is to provide an improved cold brew coffee apparatus that is fully invertible wherein the apparatus is of hourglass shape/design to facilitate brewing and dispensing.

A further object of the present invention is to provide an improved cold brew coffee apparatus wherein a unique coffee filter system is free standing and integrates into the brew chamber easily and with no mess.

Finally, it is an objective of the present invention is to provide an improved cold brew coffee apparatus which is a fully enclosed system, whereby coffee grounds are brewed in cold water for extended period of time for better taste and flavor and can be stored in a refrigerator for up to two weeks. These and other objects of the present invention will become better understood with reference to the appended Summary, Description, and Claims.

SUMMARY

The present invention relates to an improved apparatus for brewing coffee to produce a liquid extract/concentrate that can be brewed in cold water and which can be stored fresh in the refrigerator for up to two weeks. The apparatus solves the inherent problems of hot brew methods that produce a bitter, acidic coffee, and improves the art of cold brewing.

The cold brew coffee apparatus comprises a filter assembly, a center tie piece, a brew chamber and an extract chamber. The filter assembly includes an outer cup, a hollow inner housing and a micro-fine wire mesh coffee filter secured between the outer cup and inner housing. The wire mesh is exposed between the side walls of the outer cup and inner housing. The center tie piece is hollow and comprises two conical extremities connected by a narrow midsection. The extract chamber is the same size as the brew chamber, and is mounted to the end of the center tie piece opposite the brew chamber.

To brew coffee, the filter assembly is filled with grounds and the rim at its open end is securely received to the inside bottom surface of the brew chamber. The brew chamber is inverted and made to stand on its base so that the filter assembly is upside-down. Water is poured into the brew chamber, filling the base assembly and soaking the grounds. The center tie piece is attached with a quarter turn that engages threading at the junction of the brew chamber and the center tie piece. The extract chamber is then mounted to an opposite end of the center tie piece. A gasket or an o-ring on the threading prevents leakage between the brew/extract chambers and the center tie piece. The apparatus is then left to brew for twelve hours to complete the cold brew cycle.

After the proper level of infusion is reached, usually after twelve hours, the brew cycle is complete. The apparatus is then inverted, and cold brewed coffee is drained out of the used grounds in the filter chamber and into the extract chamber. Once the coffee has drained from the filter, the brew chamber can be disassembled and the coffee grounds are disposed. Cold brewed coffee can be decanted from the extract chamber into a storage container. The storage container may be kept in a refrigerator to store the cold brewed coffee for up to two weeks. The filter assembly, the center tie piece and brew and extract chambers can then be cleaned for re-use.

Cold brewed coffee is more concentrated and less acidic than conventionally brewed coffee. To approximate the characteristics of a typical cup of coffee, it can be diluted with hot water. According to preference, it may also be consumed at a higher concentration, or used to prepare an iced beverage. In one preferred embodiment of the invention, the main structural components are composed of acrylic or polycarbonate. In addition, all of the parts of the apparatus are reusable.

FIGURES—REFERENCE NUMBERS

Figure 1:
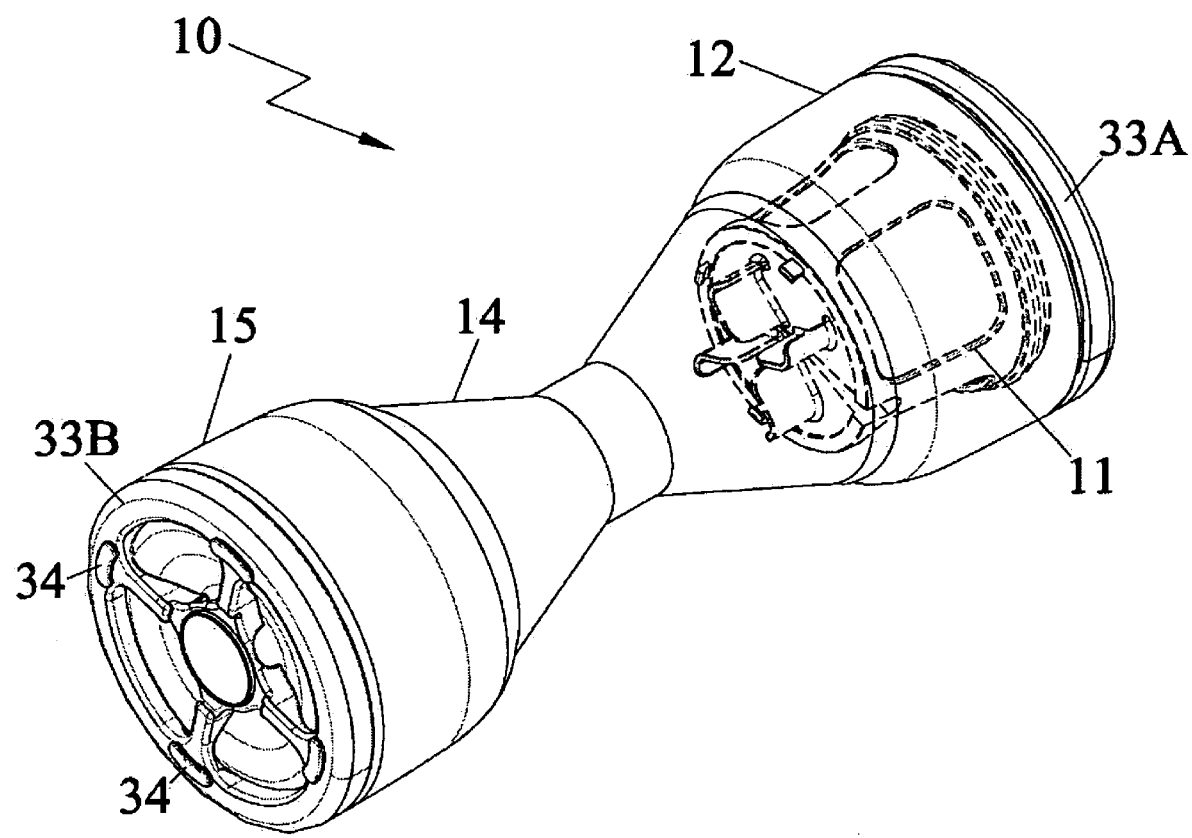
FIG. 1 is a perspective view of a cold brew coffee apparatus in accordance with the present invention.
Figure 2:
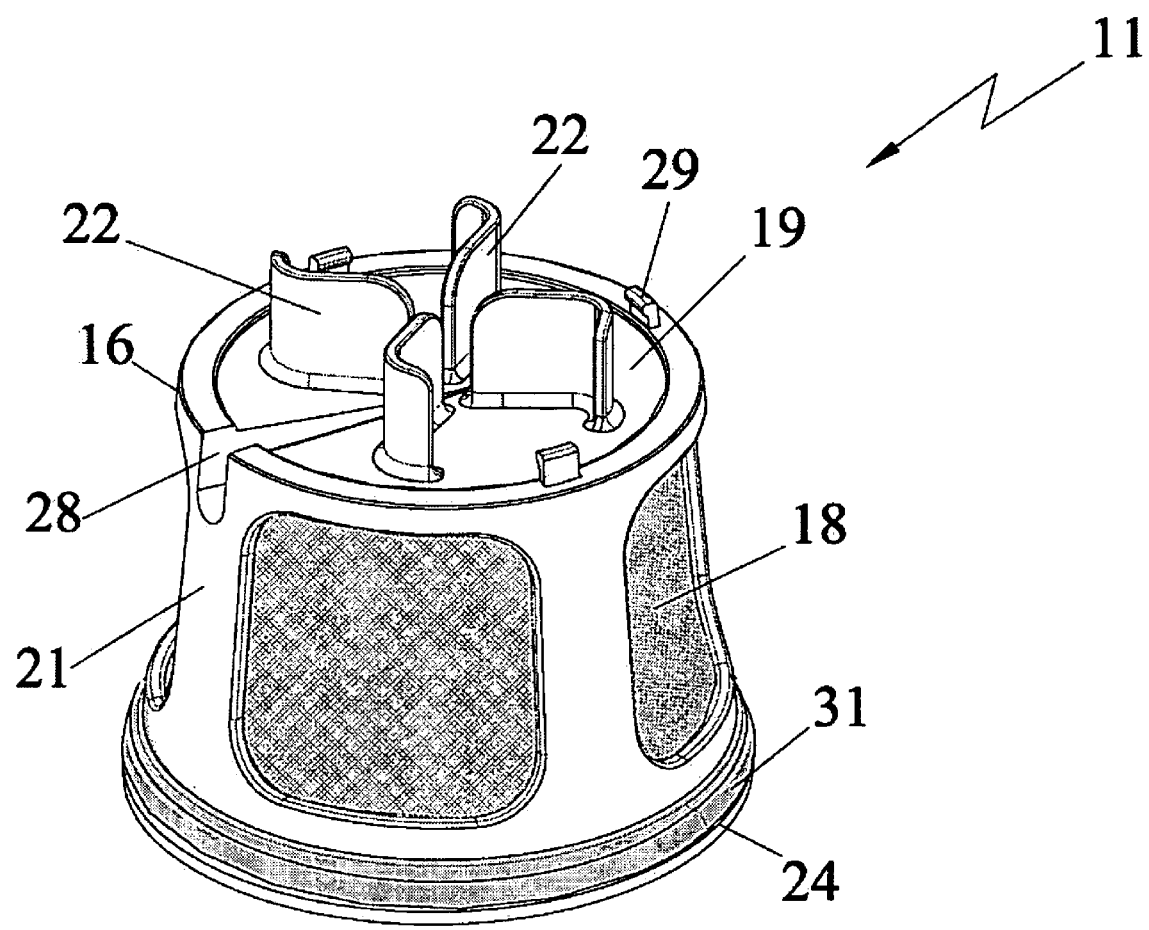
FIG. 2 is a perspective view of the filter assembly of the cold brew coffee apparatus of the present invention.
Figure 3A:
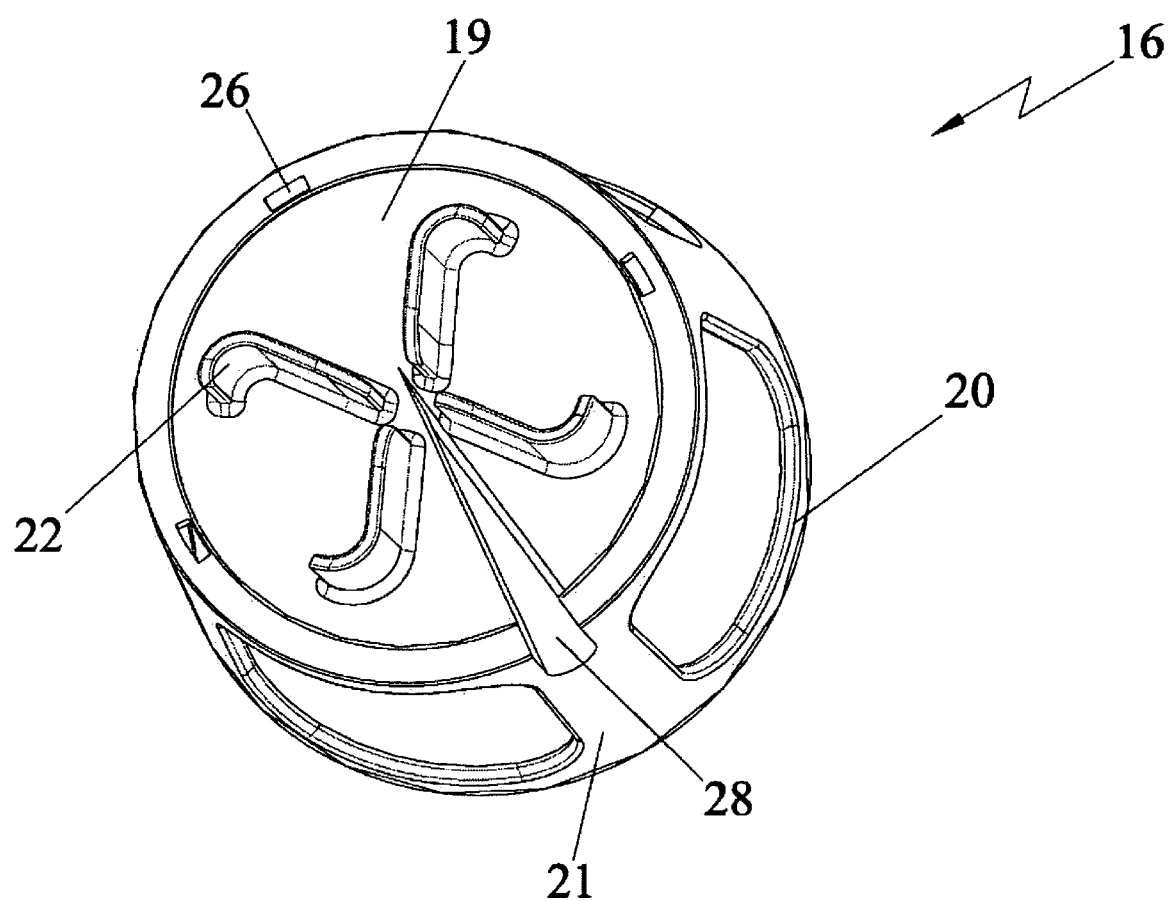
FIGS. 3A, 3B and 3C are different views of the outer cup of the filter assembly.
Figure 3B:
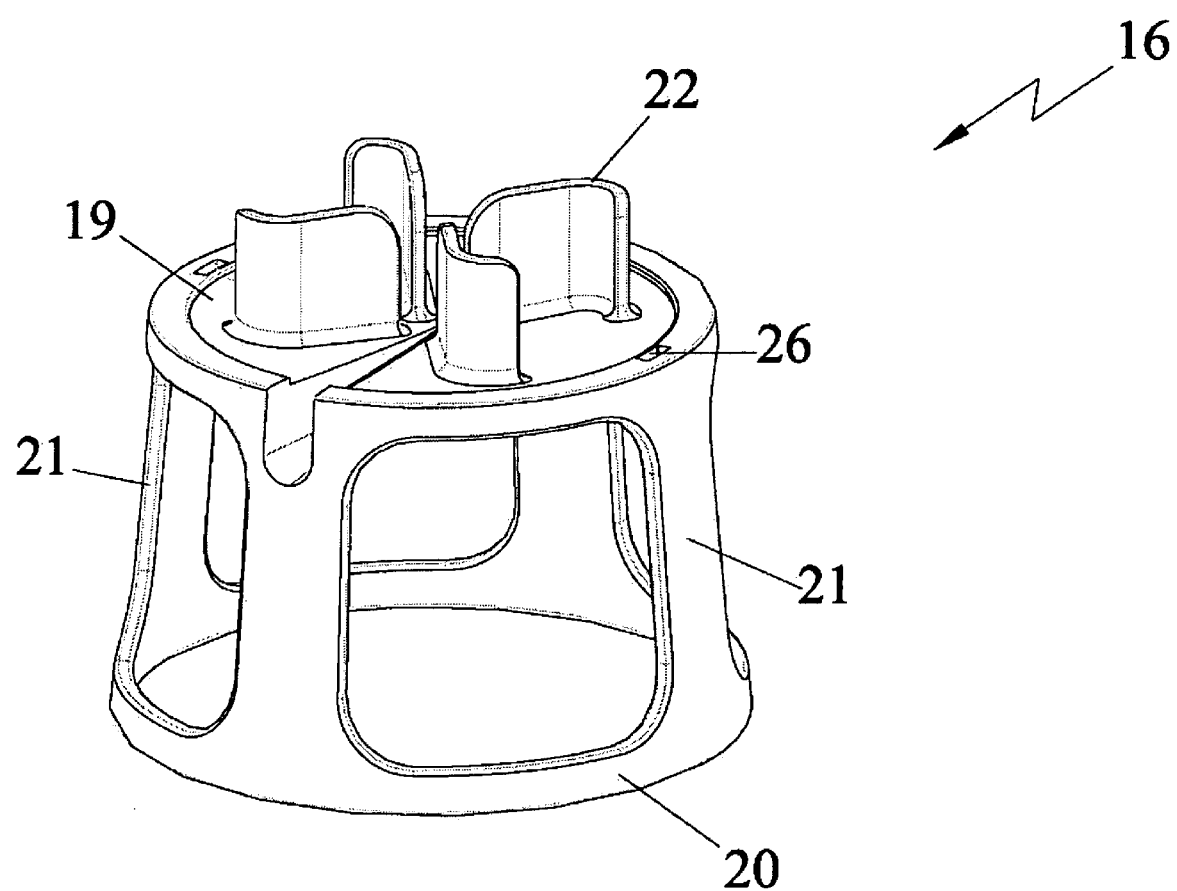
Figure 3C:
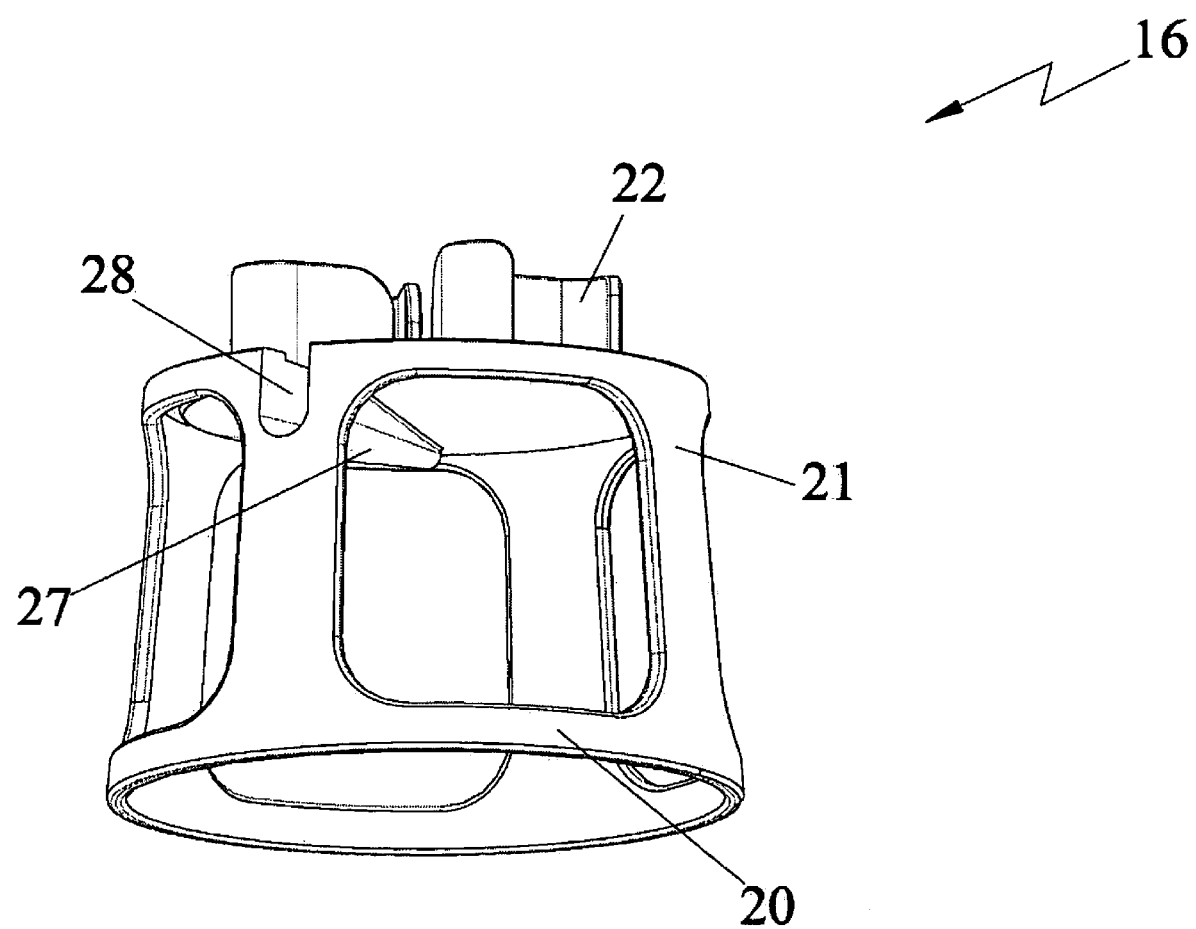
Figure 4A:
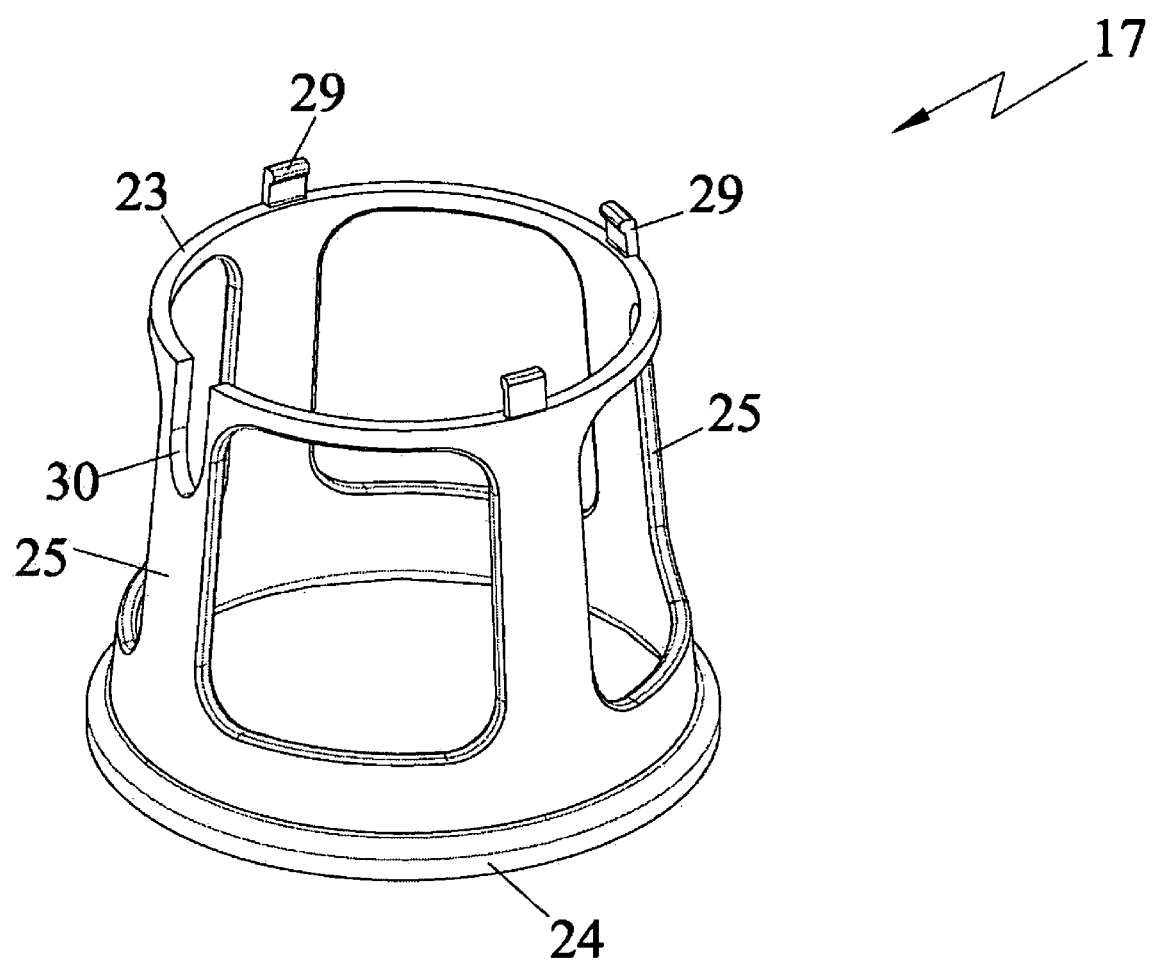
FIGS. 4A and 4B are perspective views of the inner cup of the filter assembly.
Figure 4B:
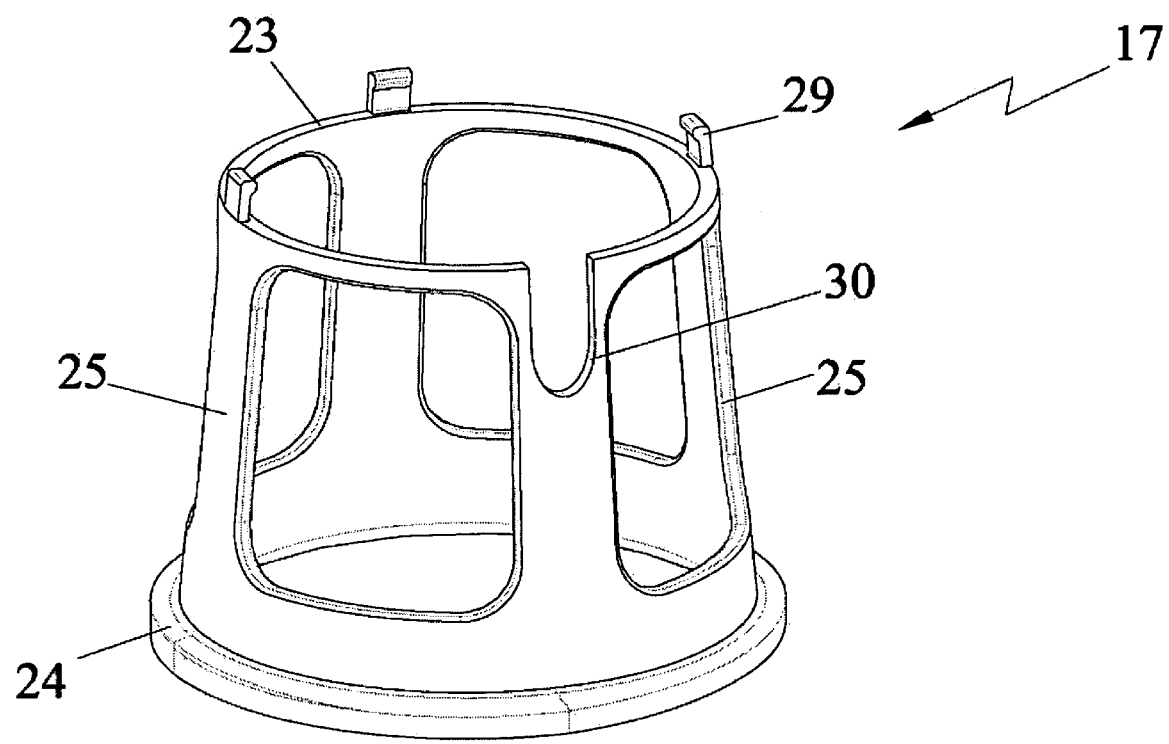
Figure 5:
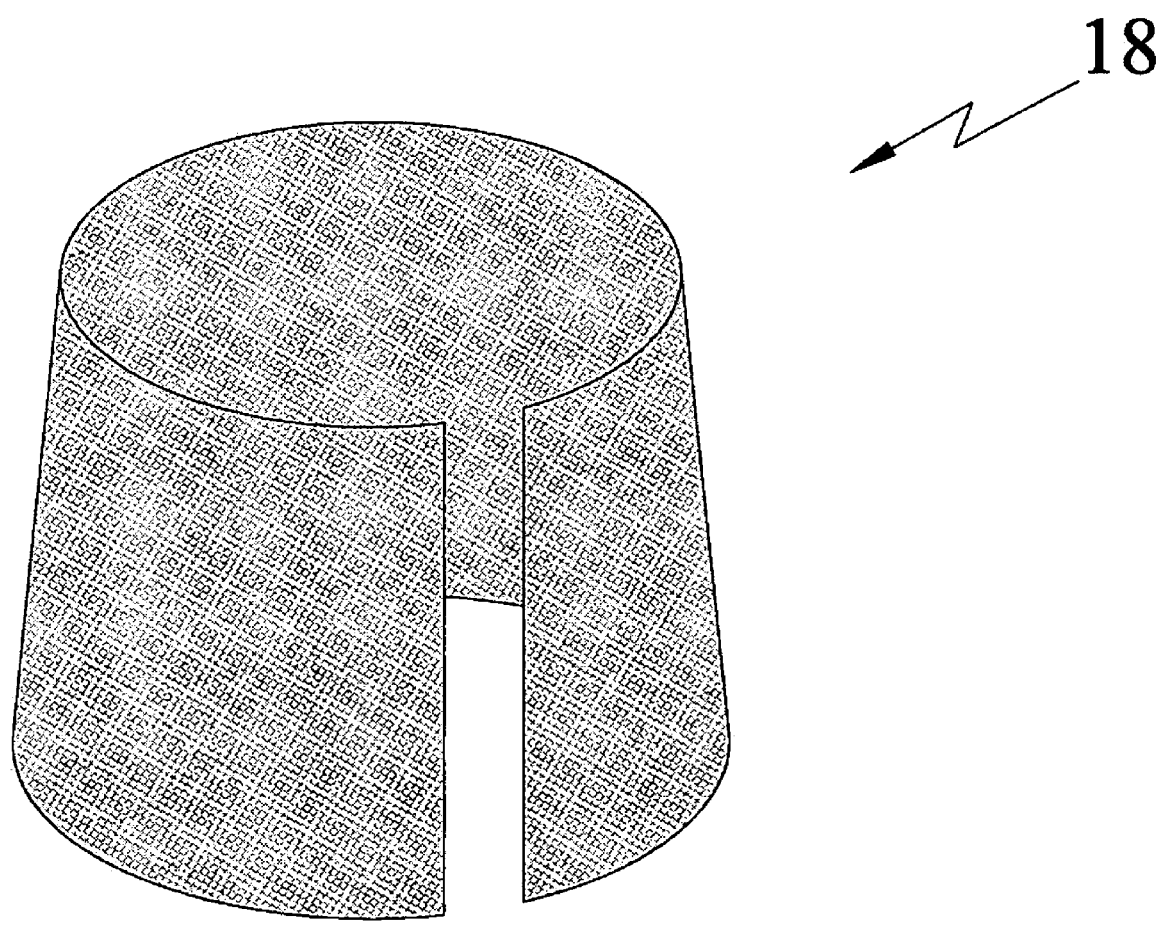
FIG. 5 is a perspective view of the wire mesh coffee filter of the filter assembly.

10 ... Cold Brew Coffee Apparatus
11 ... Filter Assembly
12 ... Brew Chamber
13 ... Carafe Assembly
14 ... Center Tie Piece
15 ... Extract Chamber
16 ... Outer Cup
17 ... Inner Housing
18 ... Wire Mesh
19 ... Flat Surface of the Outer Cup
20 ... Rim of the Outer Cup
21 ... Connecting Member of the Outer Cup
22 ... Leg Member
23 ... First Rim of the Inner Housing
24 ... Second Rim of the Inner Housing
25 ... Connecting Member of the Inner Housing
26 ... Hole on the Outer Cup
27 ... Projection Section on the Outer Cup
28 ... Groove on the Outer Cup
29 ... Projecting Member on the Inner Housing
30 ... Groove on the Inner Housing
31 ... Gasket
32 ... Cylindrical Depression in the Brew Chamber
33A ... First Cap
33B ... Second Cap
34 ... Gripping Pad
35 ... Conical Member
36 ... Threaded Mouth of the Extract/Brew Chamber
37 ... Threaded End of the Center Tie Piece
38 ... Pour Lip
39 ... Logo Button
40 ... Hole in the Cap

DESCRIPTION

The novel features of the present invention will become apparent from the following description of the preferred embodiment, and as illustrated in FIGS. 1 through 11. The present invention is an hourglass-shaped cold brew coffee apparatus 10, which comprises a filter assembly 11, a brew chamber 12, and a carafe assembly 13. The carafe assembly 13 is comprised of a center tie piece 14 and an extract chamber 15.

Referring to FIGS. 2 through 5, the filter assembly 11 includes an outer cup 16, an inner housing 17 and a micro-fine wire mesh 18 that filters out coffee grounds from the infused water. The outer cup's structure comprises a substantially flat surface 19 and a rim 20 opposite and connected to the flat surface 19 by four connecting members 21, which leave four large openings in its side walls. Four arced leg members 22 on the flat surface 19 of the outer cup 16 serve as feet to support the filter assembly 11 on any flat surface as the filter assembly is filled with coffee grounds. The inner housing's 17 structure comprises a first rim 23 and a second rim 24 connected to the first rim 23 by four connecting members 25, which also leave four large openings in its side walls. The second rim 24 projects outwardly from the exterior of the inner housing 17. The wire mesh 18 is secured between the outer cup 16 and inner housing 17 so that it is exposed from between their connecting members 21 and 25, thereby enabling the coffee extract to pass through.

The side walls of the outer cup 16 are slightly sloped towards the flat surface 19 and the side walls of the inner housing 17 are slightly sloped towards the first rim 23, so that the inner housing is telescopically received in the outer cup. In addition, the external dimensions of the inner housing 17 are substantially equal to the internal dimensions of the outer cup 16, leaving a small clearance between them to firmly accommodate the wire mesh 18. The outer cup 16 includes three holes 26 around the periphery of its flat surface 19 and a projecting section 27, which radially projects downwards from the flat surface 19. The projecting section 27 extends into one of the connecting members and forms a groove 28 on top of the flat surface 19. The interior of the flat surface 19 includes a radially oriented groove (not shown) for receiving the first rim 23 of the inner housing 17. The first rim 23 includes three projecting members 29 and a groove 30 on one of the connecting members. The projecting members 29 are suitably designed to snap into the holes 26 of the outer cup 16.

In order to secure the inner housing 17 inside the outer cup 16, the projecting section 27 is received in the groove 30 of the inner housing and the projecting members 29 are snapped into the holes 26 of the outer cup, by pushing the inner housing inside the outer cup. But, first the wire mesh 18 is wrapped around the inner housing 17 before it is secured inside the outer cup 16. A gasket 31 or an o-ring is placed between the rim 20 of the outer cup and the second rim 24 of the inner housing.

Figure 6A:
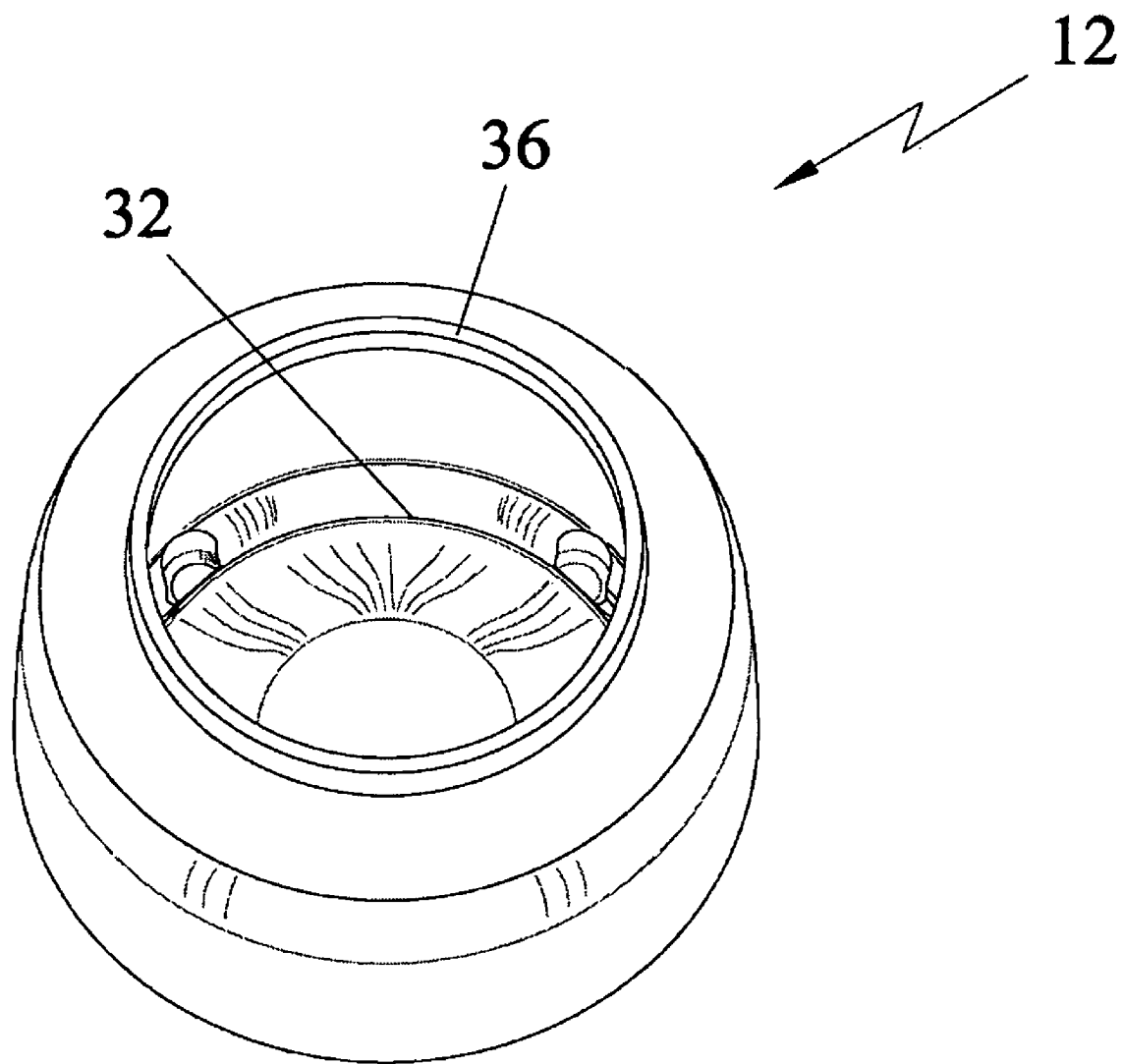
FIGS. 6A and 6B are perspective views of brew/extract chamber.
Figure 6B:
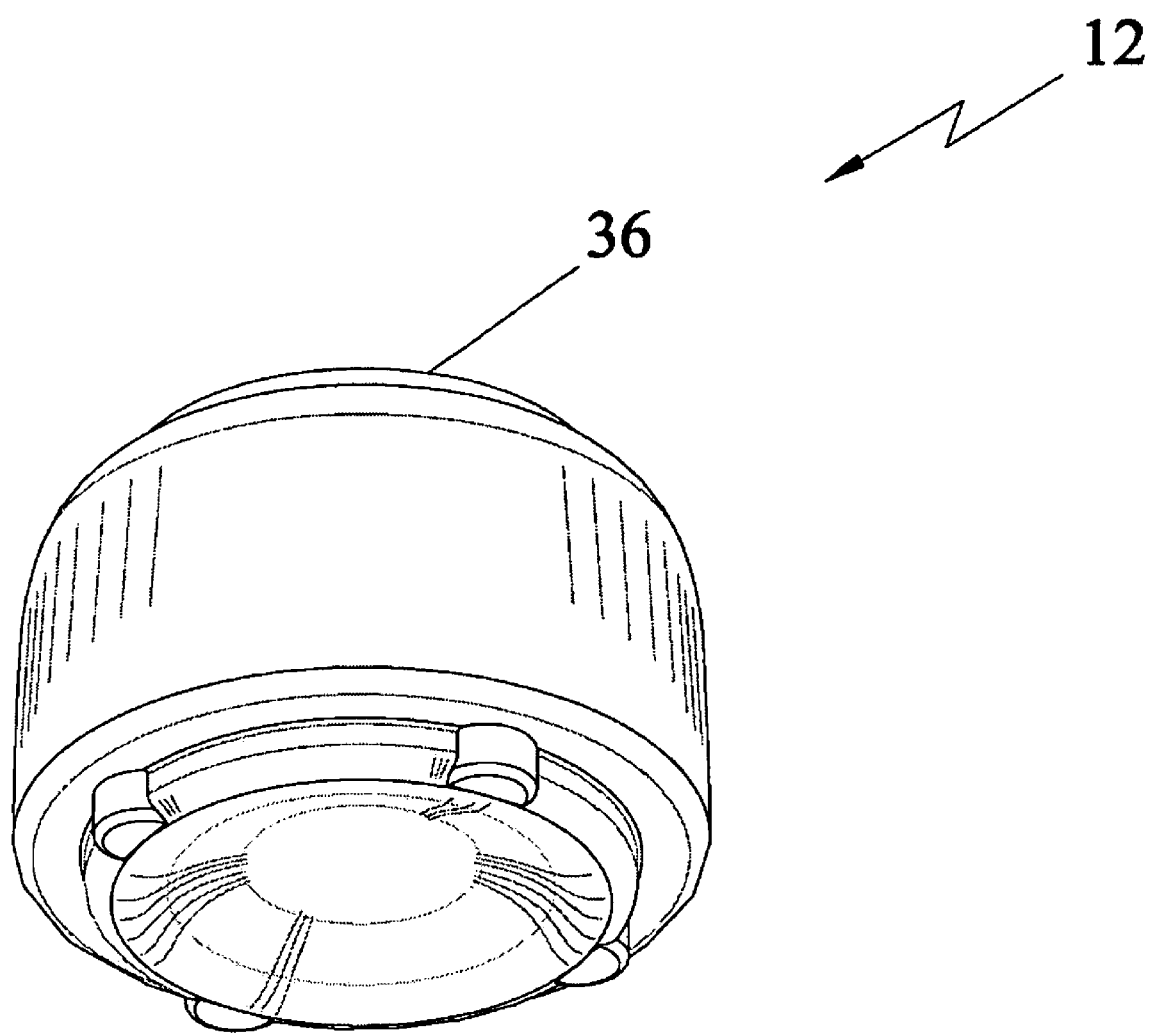
Figure 7:
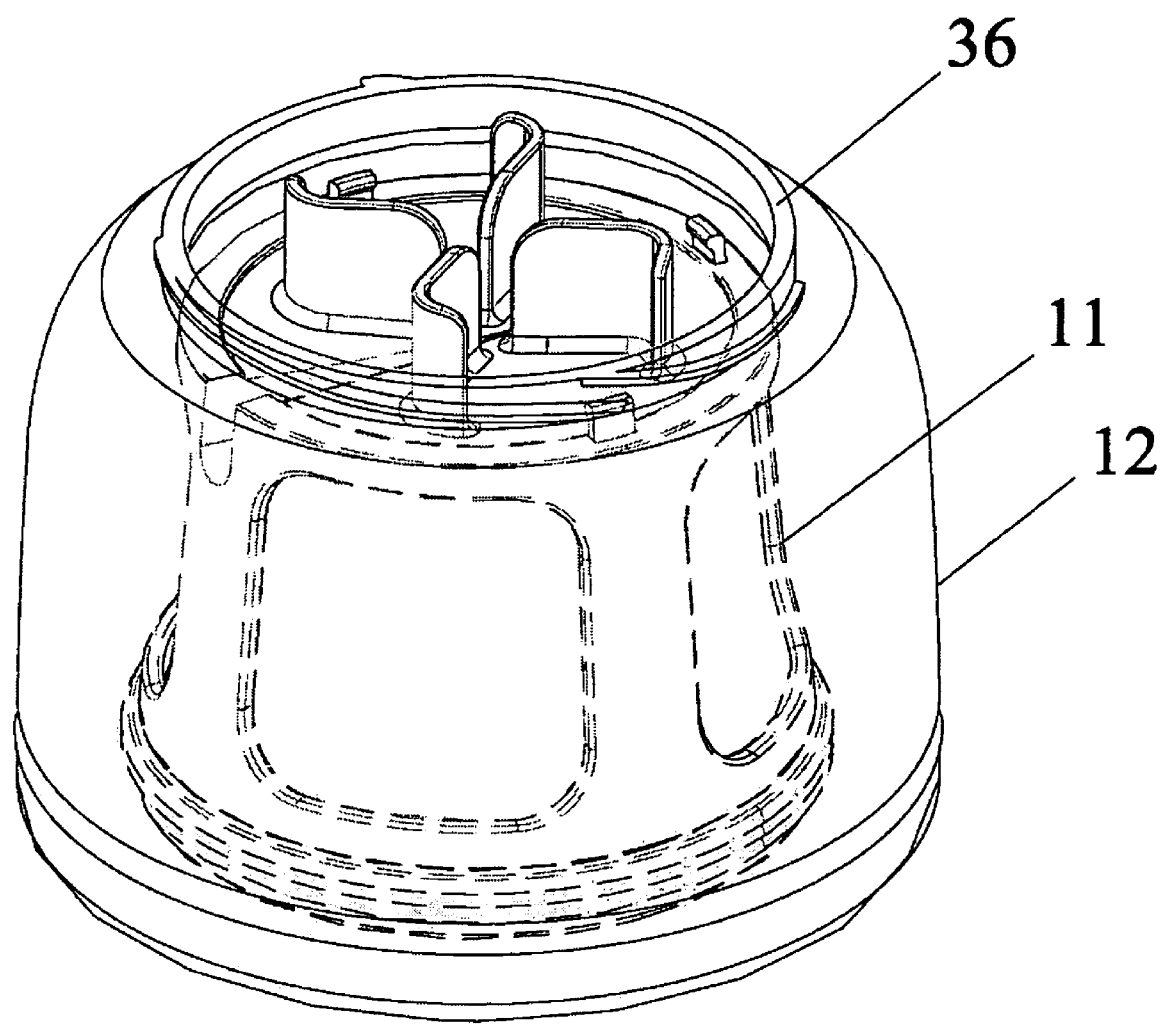
FIG. 7 is a perspective view of the brew chamber with the filter assembly.

Referring to FIGS. 6 and 7, the brew and extract chambers 12 and 15 are identical and constitute approximately one fourth the size of the whole apparatus 10, representing the ends of an hourglass shape. The interior of the bottom surface of the brew chamber 12 includes a cylindrical depression 32 that is adapted to receive the second rim 24 of the inner housing 17. The gasket 31 placed between the rim 20 of the outer cup and the second rim 24 of the inner housing helps in achieving a secure fit between the filter assembly 11 and the brew chamber 12.

Figure 8A:
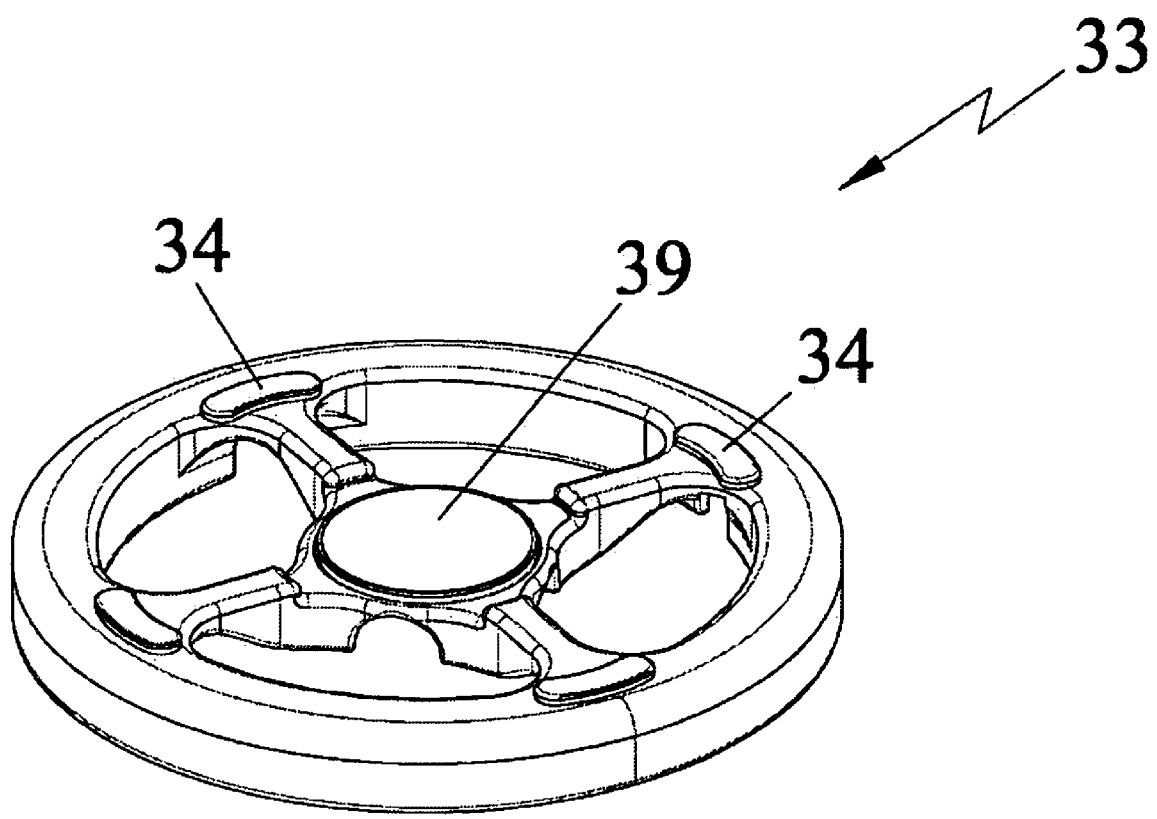
FIGS. 8A and 8B are perspective views of the end caps with gripping pads.
Figure 8B:
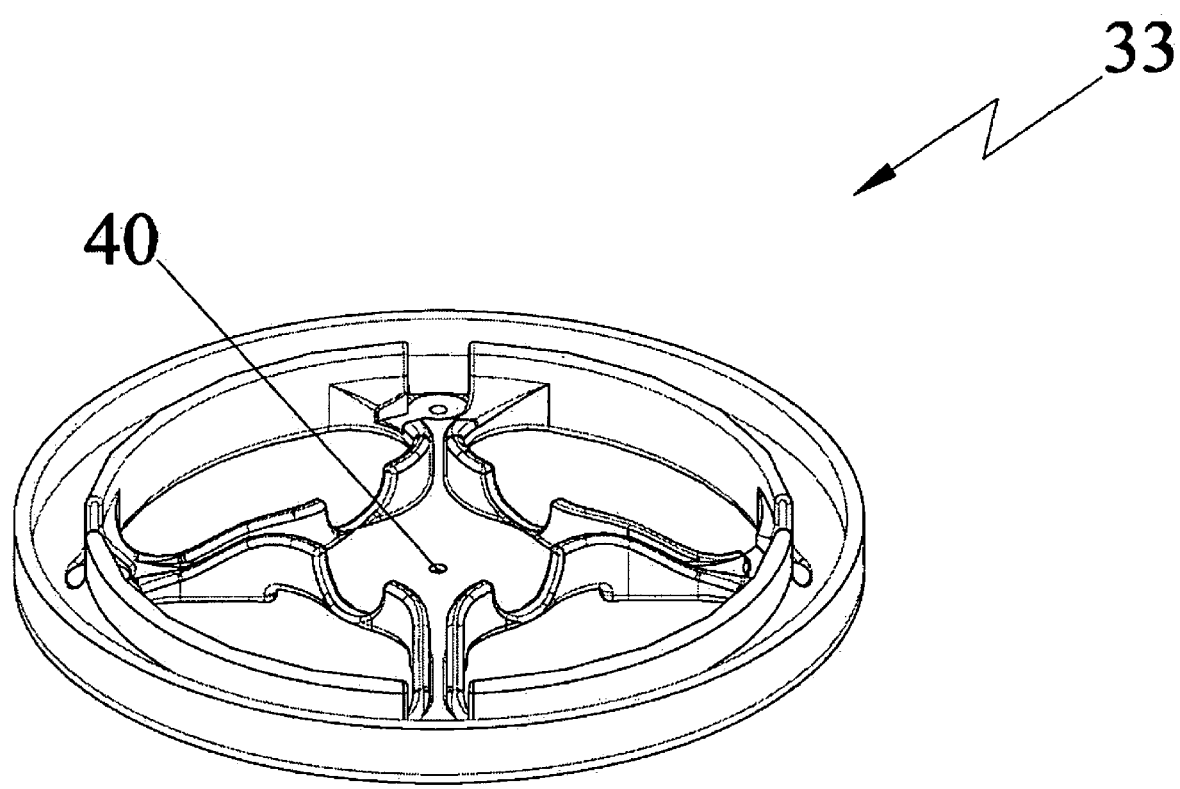

Referring to FIGS. 8A and 8B, a first cap 33A is attached to the brew chamber 12. The cylindrical depression 32 in the interior of the brew chamber leads to a cylindrical projection on its exterior bottom surface. The first cap 33A is adapted to be firmly attached over the cylindrical projection. A second cap 33B, similar to the first cap 33A, is attached to the bottom of the extract chamber 15. Several designs and structures are possible for the caps, one of them being shown in FIGS. 8A and 8B. The caps act as a base and further include a plurality of gripping pads 34 made of rubber or other anti-slip materials. The center portion of the caps may include a logo button 39, which can be snapped in the hole 40. Even the gripping pads can be snapped in the caps.

Figure 9A:
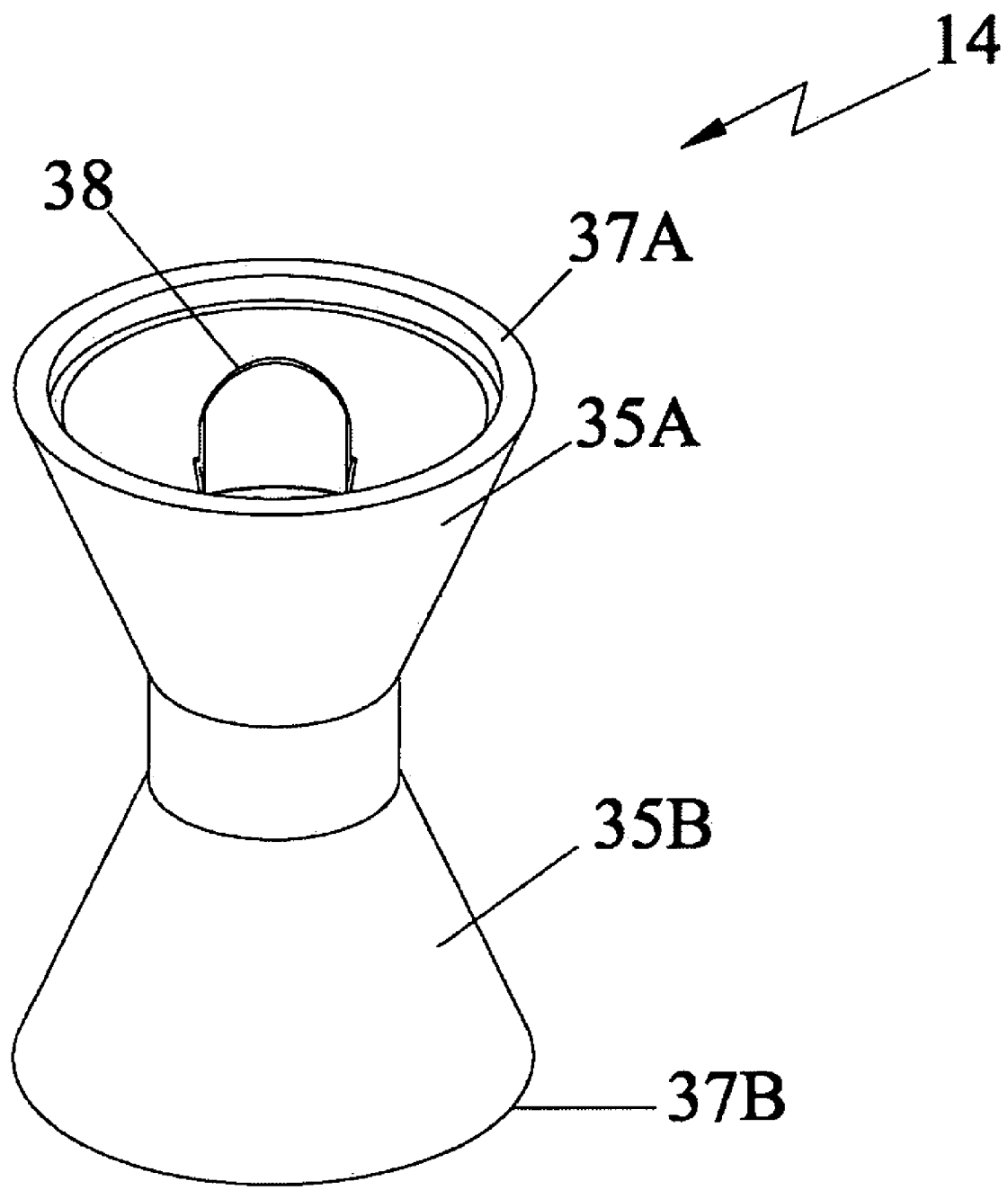
FIGS. 9A and 9B are perspective views of the center tie piece.
Figure 9B:
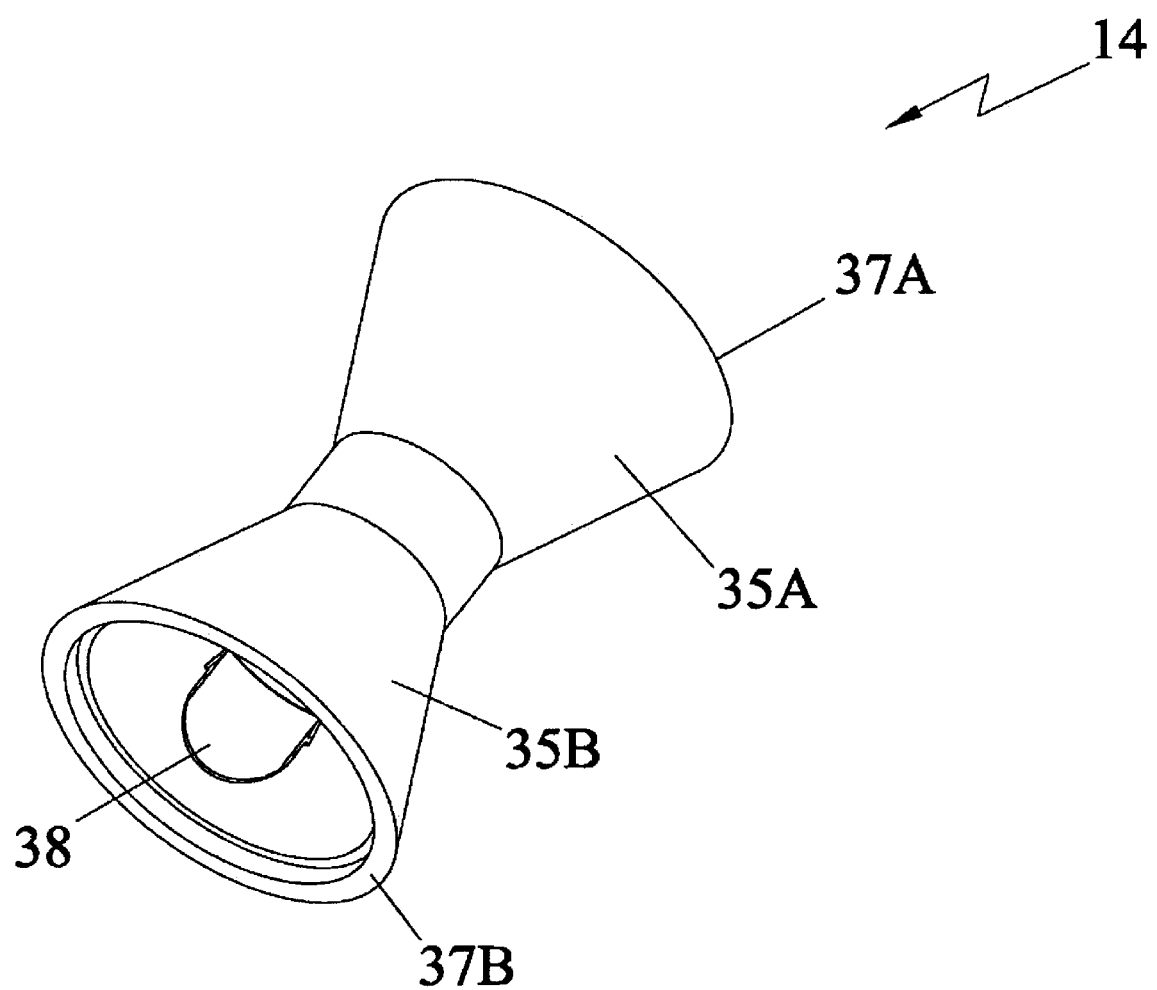
Figure 10:
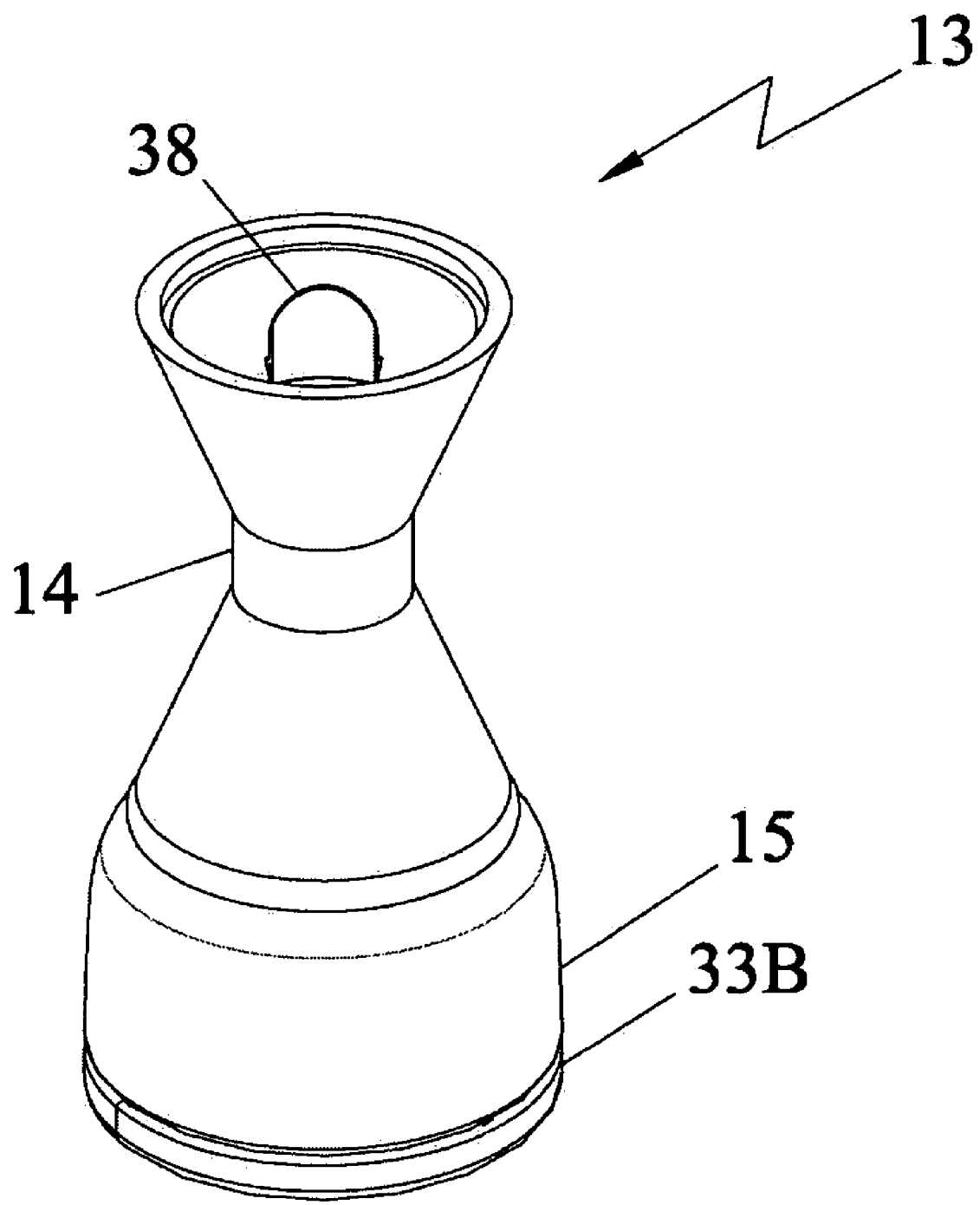
FIG. 10 is a perspective view of the carafe assembly.

Referring to FIGS. 9A and 9B, the center tie piece 14 is hollow and comprises two conical members 35A and 35B connected at their vertices. The center tie piece 14 is approximately half the size of the apparatus 10. The inner surface of the conical members includes pour lips 38. The brew and extract chambers include helical threaded indentation on the exterior of their mouths 36, which are adapted to engage a complimentary set of threaded indentation on the inner surfaces of the two ends 37 of the center tie piece 14 with a quarter turn. A gasket is used to form a hermetic seal at the junction of the center tie piece 14 and the brew/extract chambers. The center tie piece 14 along with the brew and extract chambers 12 and 15 mounted to its either ends are so designed in order to conform to an hourglass shape.

Figure 11:
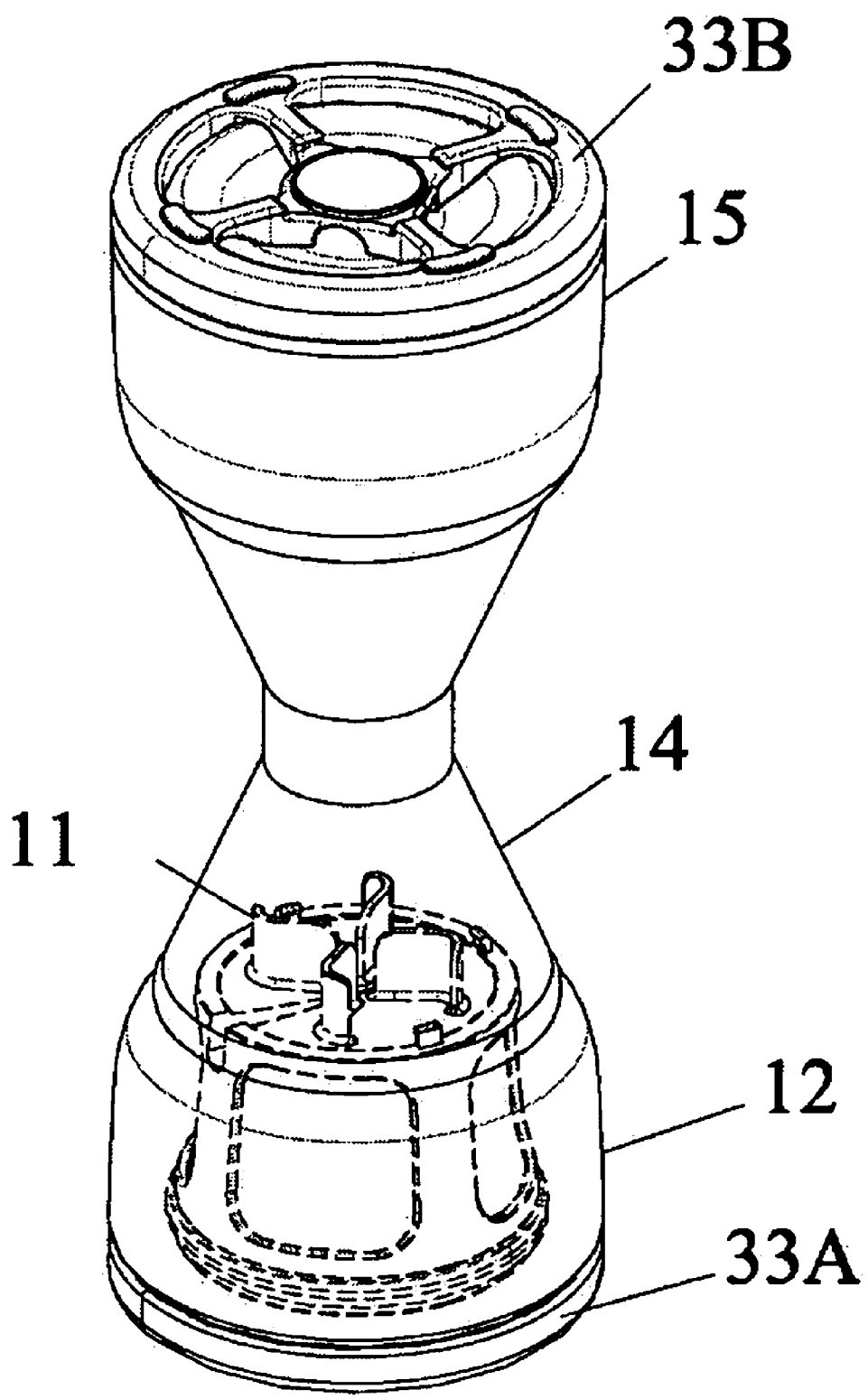
FIG. 11 is a front view of the cold brew coffee apparatus of the present invention, fully assembled and standing on the brew chamber.

In order to use the apparatus, first fresh coffee grounds are placed in the filter assembly 11, which is balanced and supported by the leg members 22. The brew chamber 12 with its associated cap 33A is inverted and fitted over the filter assembly 11, sealing in place with the gasket 31 on the filter assembly. The grounds are thereby enclosed. The brew chamber 12 is then inverted so the first cap 33A is down and the leg members 22 of the filter assembly 11 are facing up. Then the brew chamber 12 can be filled with water until the grounds are submerged. The groove 28 channels water into the brew chamber to soak the grounds. One of the ends 37A of the center tie piece is mounted to the brew chamber 12, with a quarter turn. The extract chamber is then mounted to an opposite end 37B of the center tie piece 14. The apparatus 10 now stands on the brew chamber 12, particularly on the first cap 33A attached to the brew chamber 12, as seen in FIG. 11. The gaskets prevent leakage after the apparatus is assembled. Water soaks into the grounds and starts the cold brew infusion process. The brewing process takes approximately twelve hours.

Figure 12:
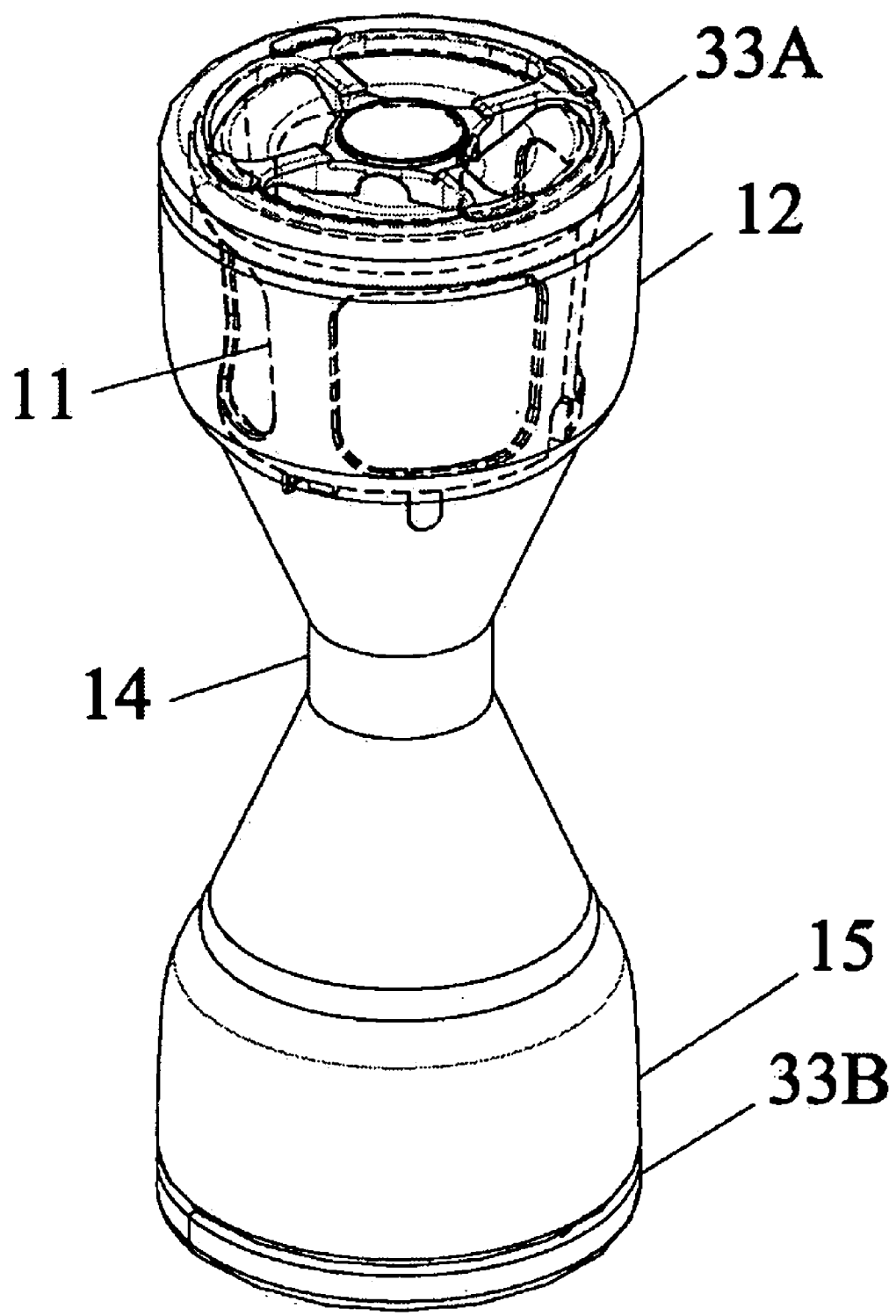
FIG. 12 is a front view of the cold brew coffee apparatus of the present invention, fully assembled and standing on the extract chamber to collect the coffee.

After the brew cycle is complete, the apparatus 10 is inverted and made to stand on the extract chamber 15, as seen in FIG. 12. Cold brewed coffee extract will drain out of the filter assembly 11 and the brew chamber 12, and into the extract chamber 15 through the center tie piece 14. The apparatus 10 takes approximately five minutes to complete this step. After all the extract has drained into the extract chamber 15, the brew chamber 12 and incorporated filter assembly 11 can be disconnected and the coffee grounds disposed of. The coffee extract is then poured form the carafe assembly into a storage container and can be kept fresh in a refrigerator for up to two weeks. Once the coffee has been dispensed, the entire apparatus can be disassembled and cleaned.

Coffee brewed in the apparatus 10 is a deep rich extract coffee concentrate, and is far less acidic than conventionally brewed coffee. It can be diluted with hot water to a desired taste and strength. To make a typical cup of coffee, two tablespoons of extract are added to 8 oz of hot water. More or less concentrate can be added for desired taste and strength. In one preferred embodiment of the invention, the brew chamber, the extract chamber, and the center tie piece of the apparatus are made of acrylic or polycarbonate material.

The features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

What is claimed is:

1. A method of brewing concentrated beverage extract, using a flip-action cold brew extract maker comprising a brew chamber and an extract chamber, the method comprising the steps of:
   a) filling a brew chamber with material to be extracted;
   b) filling the brew chamber with water;
   c) allowing the water to infuse into the material, generating an extract, and;
   d) inverting the extract maker, allowing the extract to fall into an extract chamber for dispensing,
   wherein after the material to be extracted is brewed, the extract maker is inverted to stand on the extract chamber, opposite the brewing chamber and filter, for collecting the extract.

2. The method as recited in claim 1, wherein the material to be extracted is coffee from ground coffee beans.

3. The method as recited in claim 2, further comprising the step of-opening the brew chamber and removing a filter.

4. The method as recited in claim 3, wherein the amount of coffee placed in the brew chamber is approximately 2 cups by volume.

5. The method as recited in claim 1, wherein the extract maker further comprises an hourglass shaped middle unit.

6. The method as recited in claim 1, wherein the step of inverting the extract maker includes grabbing the extract maker at the center of the hourglass shaped middle unit.

7. The method as recited in claim 6, wherein after the extract is decanted into a vessel for storage under refrigeration for up to two weeks.

8. The method as recited in claim 1, wherein said extract maker comprises a first container having a base and side walls forming an interior volume, and an opening opposite said base.

9. The method as recited in claim 8, wherein said extract maker comprises a second container having a base and side walls forming an interior volume, and an opening opposite said base.

10. The method as recited in claim 9, wherein said first container and said second container are capable of forming a water impermeable seal at said first container opening and said second container opening wherein a filter fits within said first container.

11. The method as recited in claim 10, whereby when the filter is secured within the first container said filter forms a hermetic seal between the interior volume of the filter and the interior volume of said first container.

12. A method of brewing coffee extract, using a flip-action cold brew extract maker, comprising the steps of:
 a) opening a brew chamber and removing a filter;
 b) placing the filter on a flat surface resting on legs of the filter to receive a coffee;
 c) replacing the filter and filling the brew chamber with water;
 d) allowing the water to infuse into the coffee, generating a coffee extract, and;
 e) inverting the extract maker, allowing the extract to fall into an extract chamber for dispensing.

13. A method of brewing coffee extract using a flip-action cold brew extract maker comprising a brew chamber and an extract chamber, comprising the steps of:
 a) filling a brew chamber with coffee;
 b) filling the brew chamber with water;
 c) standing the extract maker upright in a vertical position on a flat surface resting on a base of the brew chamber for at least about 12 hours at room temperature allowing the water to infuse into the coffee, thereby generating an extract, and;
 d) inverting the extract maker, allowing the extract to fall into an extract chamber for dispensing.

14. The method as recited in claim 13, wherein the brewing step includes resting the base comprising a plurality of gripping pads for providing grip to the extract maker.

* * * * *